(12) United States Patent
Van Drie

(10) Patent No.: US 7,476,054 B2
(45) Date of Patent: Jan. 13, 2009

(54) PROCESS FOR HIGH-VOLUME DISPOSAL OF SLUDGE AND COLLECTION OF COMBUSTIBLE GASES

(76) Inventor: Gerhardt Van Drie, 724 W. Pine Ave., El Segundo, CA (US) 90245

( * ) Notice: Subject to any disclaimer, the term of this patent is extended or adjusted under 35 U.S.C. 154(b) by 8 days.

(21) Appl. No.: 11/825,787

(22) Filed: Jul. 9, 2007

(65) Prior Publication Data

US 2008/0170910 A1    Jul. 17, 2008

Related U.S. Application Data

(60) Provisional application No. 60/901,565, filed on Feb. 14, 2007, provisional application No. 60/859,787, filed on Nov. 17, 2006.

(51) Int. Cl.
*B09B 1/00* (2006.01)
(52) U.S. Cl. .................................................. 405/129.35
(58) Field of Classification Search ............... 405/129.1, 405/129.35, 129.85
See application file for complete search history.

(56) References Cited

U.S. PATENT DOCUMENTS

| | | | |
|---|---|---|---|
| RE20,056 E | | 8/1936 | McCarthy |
| 2,164,536 A | * | 7/1939 | McCarthy ................ 405/129.1 |
| 3,511,056 A | | 5/1970 | Jones |
| 3,597,927 A | | 8/1971 | Hemphill |
| 3,978,673 A | | 9/1976 | Schleede |
| 4,010,098 A | | 3/1977 | Fassell |
| 5,242,246 A | | 9/1993 | Manchak, III et al. |
| 5,280,757 A | | 1/1994 | Carter et al. |
| 6,742,962 B2 | | 6/2004 | Hater et al. |

* cited by examiner

*Primary Examiner*—John Kreck
(74) *Attorney, Agent, or Firm*—Gene Scott; Law & Venture Group

(57) ABSTRACT

A method for the disposal of sludge and collection of byproduct gases of decomposition uses a crisscross trenching pattern, excavated, filled and covered in a sequential and cyclic manner. Once the crisscrossing trenches have been completely filled with sludge, evolving gases are captured under an impermeable sheeting placed over the disposal site and then drawn off for use.

8 Claims, 3 Drawing Sheets

PROCESS FOR HIGH-VOLUME DISPOSAL OF SLUDGE AND COLLECTION OF COMBUSTIBLE GASES

CROSS-REFERENCE TO RELATED APPLICATIONS

This is a non-provisional application of U.S. Provisional Patent applications having Ser. Nos.: 60/859,787 filed on Nov. 17, 2006, and 60/901,565 filed on Feb. 14, 2007. This application claims the priority date of Nov. 17, 2006.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to methods for the disposal of waste and, more particularly, relates to such a method wherein disposal is conducted in a high-volume manner using crisscrossed trenching and backfilling.

2. Description of Related Art Including Information Disclosed Under 37 CFR 1.97 and 1.98

McCarthy, U.S. Re. 20056 discloses a method of disposing of garbage, ashes, refuse and other inferior materials wherein a trench is dug and filled with the inferior materials and an adjacent trench is next dug and the soil taken therefrom deposited on top of the inferior materials in the first trench. This procedure is repeated until the area of land to be reclaimed is covered, a large quantity of the inferior materials thus disposed of, and the land is raised.

Jones, U.S. Pat. No. 3,511,056 discloses a method for the disposal of trash and mechanisms there for, the method being inclusive of the steps of excavating soil at a disposal site to provide a trench or depression extending below the initial ground surface, elevating the removed soil to a place above the initial ground surface with a portion of said soil being intermixed with trash before the trash and soil intermixture is re-deposited in layers in the dug depression, compacting the intermixed trash and soil materials in said depression though use of apparatus supported at least at the initial ground level elevation and having compactor elements for extension there below. The re-deposition and compaction operations are continued until the dug depression is at least refilled to an elevation corresponding to the initial ground level, and thereafter the remainder of the removed soil is redistributed to provide a cover for the intermixed deposit and to establish a new ground elevation higher than the initial ground level. Water may be added to the intermixture to improve the compaction characteristics.

Hemphill, U.S. Pat. No. 3,597,927 discloses a method and apparatus for collecting and disposing of refuse by collecting refuse from a multiplicity of garbage cans which are adapted to be automatically dumped into a compacting unit where the refuse is compacted into a bale. The bales are transported to a digging apparatus which provides a ditch by digging two parallel spaced-apart vertical slots within the earth and removing the earth therefrom by passing a knife edge blade perpendicularly to and at the lower extremity of the slots to thereby continuously remove an elongated rectangular disengaged portion of the earth. The bales are placed below the surface of the ground and covered with the removed earth so as to provide the ground with improved moisture retention characteristics.

Schleede, U.S. Pat. No. 3,978,673 discloses a method of disposing liquid waste which permits incorporating large quantities of pumpable liquid wastes in the form of sludge, slime and slurry, in the surface of the earth. The method involves the steps of continuously excavating earth from one region and transporting it to and depositing it at another region and thereafter depositing the liquid waste on the earthen material. The earth is initially excavated to depths which substantially exceed the normal agricultural tillage depths, i.e. to depths of the order of at least six feet, by digging the earth from one side of a trench and then transporting it and depositing it at the other side of the trench after which the waste liquid is deposited on the earthen material so transported. This permits very large quantities of liquid waste to be incorporated in a relatively small surface area.

Fassell, U.S. Pat. No. 4,010,098 discloses a method for the treatment of solid waste and sewage sludge with the recovery of natural resources comprising subjecting all or at least a portion of the sewage sludge to wet oxidation reaction to reduce the COD by an amount of at least 50% and preferably 50-85% and using the excess heat from the wet oxidation reaction to dry the solid waste and subjecting the combined solids from the wet oxidation reaction and the solid waste to pyrolysis under non-oxidizing conditions whereby the products from the pyrolysis reaction are readily separable into valuable constituents which are easily recovered.

Manchak, III et al, U.S. Pat. No. 5,242,246 discloses a soil surface remediation apparatus useful for decontamination of oil or chemical spill sites and toxic waste containing sites comprises a soil treatment apparatus mounted on a mobile trenching machine tractor which excavates trenches in a contaminated site to remove contaminated soil to the surface apparatus where the soil is decontaminated and is immediately replaced into the excavated trench in a continuous operation. Hydrocarbons or other useful by-products such as precious metals may be recovered from the soil. Both deep trenching and shallow trenching embodiments are disclosed.

Carter et al, U.S. Pat. No. 5,280,757 discloses a process for the disposal of municipal solid waste whereby a plasma arc torch is used as an independent heat source in an enclosed reactor vessel to gasify municipal solid waste and produce a medium quality gas and an inert monolithic slag having substantially lower toxic element leach ability. The gas has lower levels of metals and semi-volatile organic compounds, particularly dioxins and furans. Other materials may also be gasified, for example, coal, wood and peat.

Hater et al, U.S. Pat. No. 6,742,962 discloses a trench located in a landfill including the combination of a liquid infiltration piping system and a horizontal gas withdrawal piping system, the combination allowing for simultaneous liquid infiltration and gas withdrawal from a landfill.

The related art, described above, discloses methods for the disposal of various forms of waste using trenches dug in an adjacent, parallel fashion. However, the prior art fails to disclose disposing of such waste using trenches dug in a grid pattern, thus greatly increasing the amount of waste that can be disposed of per acre of the disposal site. Additionally, the prior art teaches the collection or disposal of byproduct gases. The prior art, however, fails to teach an easily implemented, relatively low-cost method of collecting such gases. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The disposal of sludge presents a continuing problem due to the difficulties arising from transport, processing, decomposition issues and toxicity. Other problems include: objectionable odors, insect infestations and disease related issues. Prior art solutions include incineration and low density dumping onto landfill sites. It is noted here that incineration is not an effective or safe manner of dealing with certain toxic wastes such as elemental mercury.

A common method of disposing of sludge involves dumping or spreading out such waste on land surfaces and at some later time even reusing these materials as fertilizer or with fertilizer products. This is dangerous since common processed sewage, or sludge often contains heavy metals such as lead, chromium, and mercury, and household and garden poisons and poisonous materials including polychlorinated biphenyl's. The present invention is a method of disposal that improves on prior art approaches by burying sludge in two or more sets of intersecting or overlapping trench systems. In digging the trenches as a grid system, or instance, one is able to significantly increase the amount of waste that can be disposed of per acre of land. The current approach of extending a trench, filling with sludge and then covering over the trench with removed earth, provides the benefits of eliminating odors, contact with above ground environment and human contact.

The method herein disclosed improves on prior art methods of collecting evolved gases, produced as a result of sludge decomposition, by capturing such gases under a gas-impermeable sheeting and drawing off the gases.

A primary objective inherent in the above described method is to provide advantages not taught by the prior art.

Another objective is to provide a method for disposal of sludge that significantly increases the amount per acre of such waste that can be disposed.

A further objective is to provide a relatively simple, low-cost method of collecting byproduct gases.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
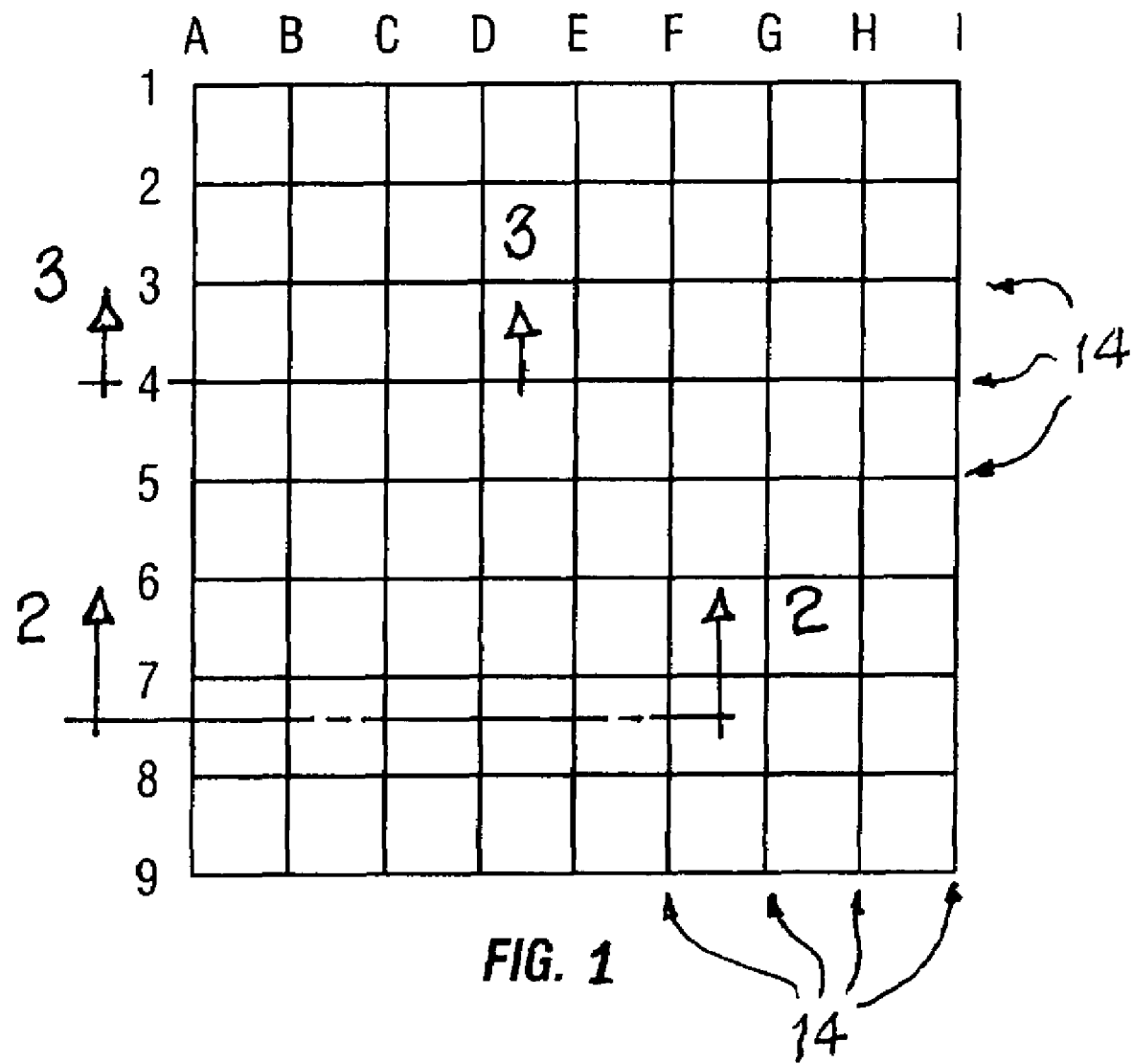
FIG. 1 is a graphic representation of a disposal site wherein vertical and horizontal lines represent the locations and orientations of trenches that are excavated as a crisscrossed pattern.
Figure 2:
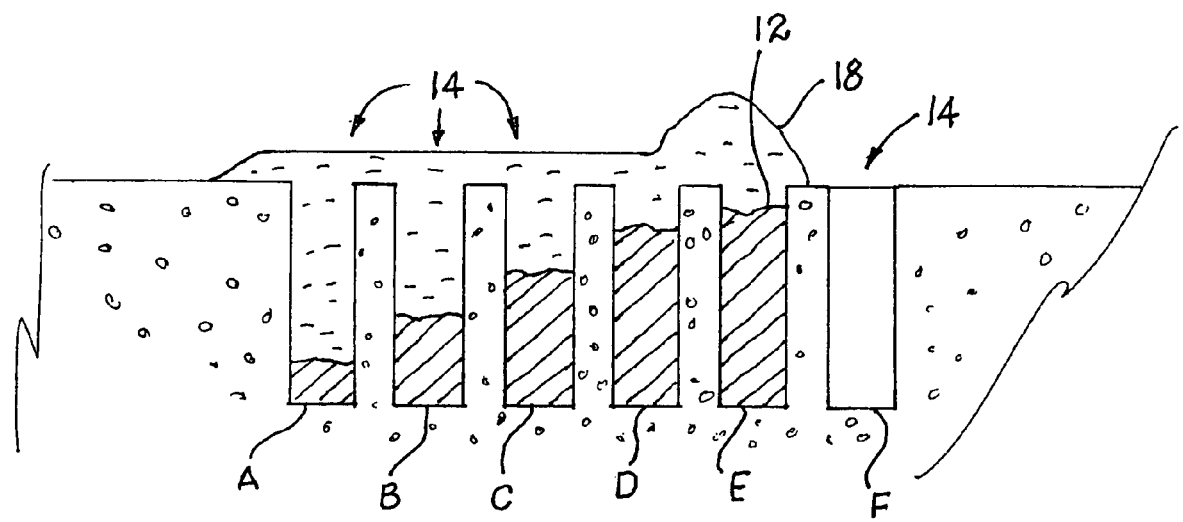
FIG. 2 is a vertical sectional view of several of the trenches, for instance those represented by letters: A-F in FIG. 1.
Figure 3:
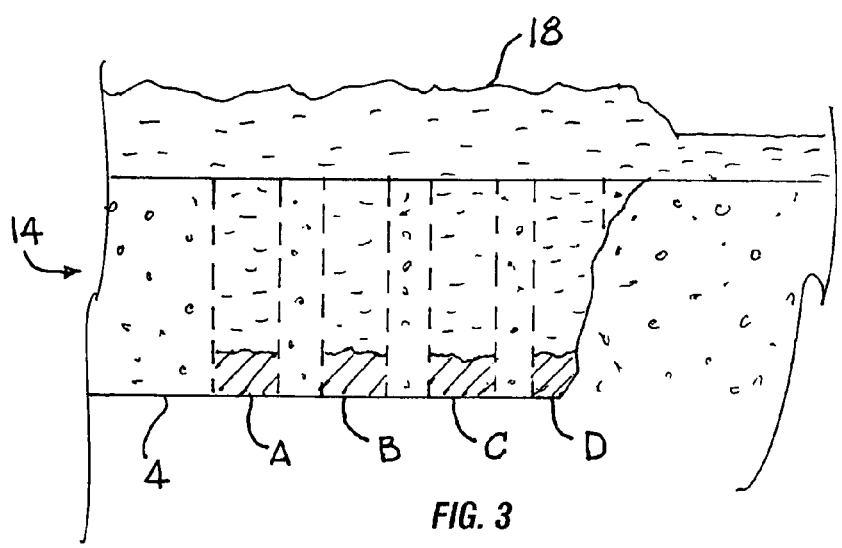
FIG. 3 is a is a vertical sectional view of a portion of trench number 3 in FIG. 1.

The present invention is a method for disposal of sludge 12 at a selected earthen land site 10. The method includes digging trenches following the grid pattern shown in FIG. 1. It is noted that this grid pattern comprises a series of rows identified by numerals 1-9 and a series of columns identified by the letters A-I forming a crisscross arrangement which is preferably formed in an orthogonal or near orthogonal arrangement, but may also be in other crisscrossed arrangements. It is also noted that the rows are preferably uniform in length with mutual alignment and consistent spacing, and the columns are also so configured. The lines shown in FIG. 1 represent excavated, linear, elongated and preferably parallel trenches, which are referenced throughout this description and in the accompanying drawing figures, generally, by the numeral 14. In the preferred embodiment, each of the trenches 14 is preferably about 10 feet in depth and about 3 feet wide, and are spaced on 5 foot centers establishing 2 foot thick walls between adjacent trenches 14, although the method may be practiced with significantly different dimensions. In a sandy soil, for instance, the walls may be thicker to prevent collapse. FIGS. 1, 2 and 3 are not represented as being drawn to scale.

FIG. 2 represents cross-section 2-2 in FIG. 1 and shows six of the trenches 14: A, B, C, D, E and F, which in FIG. 2, are excavated in that order, one at a time. The method includes digging a segment, that is, a small portion, of one of the trenches 14 with the removed earth 18, shown by a hatching of short horizontal lines, placed along one side of the trench 14 so that it can later be easily pushed into and over the trench 14 from which it was taken. This is illustrated, for example, by trench F which is shown empty with its excavated earth 18 shown piled high on the site along side trench F. Undisturbed earth is illustrated by a hatching that includes small circles and dots. Following excavation, sludge 12, shown by diagonal cross-hatching, is dumped into the trench segment to a selected height, such as within, say, 1 foot of the trench lip, as shown, and then covered over, as shown by trench E. Because processed sludge is comprised of about 85% aqueous material, mostly water, the sludge 12 settles over time as the liquid portion penetrates the side walls and bottom of the trench 14 leaving behind solid materials. This is shown by trenches A-D of FIG. 3, illustrating the natural compaction process, where trench A represents the final compacted height of the original 9 vertical feet of the sludge 12 which was initially placed in trench A.

Obviously, through the natural process of dewatering, the initially backfilled earth 18 that is placed on top of the sludge 12, sinks into the trench 14. The site, however, is tended-to and maintained continuously, with removed earth 18 added into each trench to maintain the surface of the site at a generally uniform level, as shown in FIG. 2.

Each trench 14 is dug, linearly, segment by segment, with each segment filled and covered in turn, until each trench 14, in turn, is extended to a selected overall length. Then the next trench 14 is dug, filled and covered in the same manner, with each next trench 14 following in turn, one by one, until all of the trenches are completed in a parallel arrangement over a selected distance on the site. After, the last trench of a first set of trenches 14, for instance (A-I) is completed, a second set of trenches 14, for instance (1-9), are cut, filled and covered in the same manner, and this is generally started after all of the sludge 12 in the first set of trenches A-I has had time to dewater and become fully compacted. This is shown in FIG. 3 where trench 4 is shown excavated up to trench D and the earth 18 removed from trench 4 is shown placed onto the surface of the site.

It will be noticed in FIG. 3 that excavation of the cross trenches 1-9 unearths some of the compacted sludge 12 from trenches A-I. However, being fully dewatered, at least partly decomposed, and diluted, i.e., mixed with at least four times its own volume of freshly excavated earth 18, the sludge excavated from trenches A-I in cutting trenches 1-9 represents no environmental danger. Clearly, only a small amount of this material will be exposed to the surface at any one time when the excavated earth 18 is placed on the surface.

It is well known that sludge 12, in decomposing, liberates gases as bi-products, some of which may be used as fuel. For instance, methane is a common gas found rising from certain types of deposited wastes. The term "sludge," as defined herein, is preferably made up of any one of: raw-sewage, processed sewage, manure, and similar materials. Such waste products are preferably buried to avoid exposure with the above ground environment, and are typically attacked by naturally occurring organisms in the earth which give-off the gases as a bi-product of digestion.

The present method further includes the steps of: placing a gas-impermeable sheeting 22 over the disposal site 10; sealing the sheeting 22 peripherally; and drawing off gases 13 accumulated under the sheeting.

Figure 4:
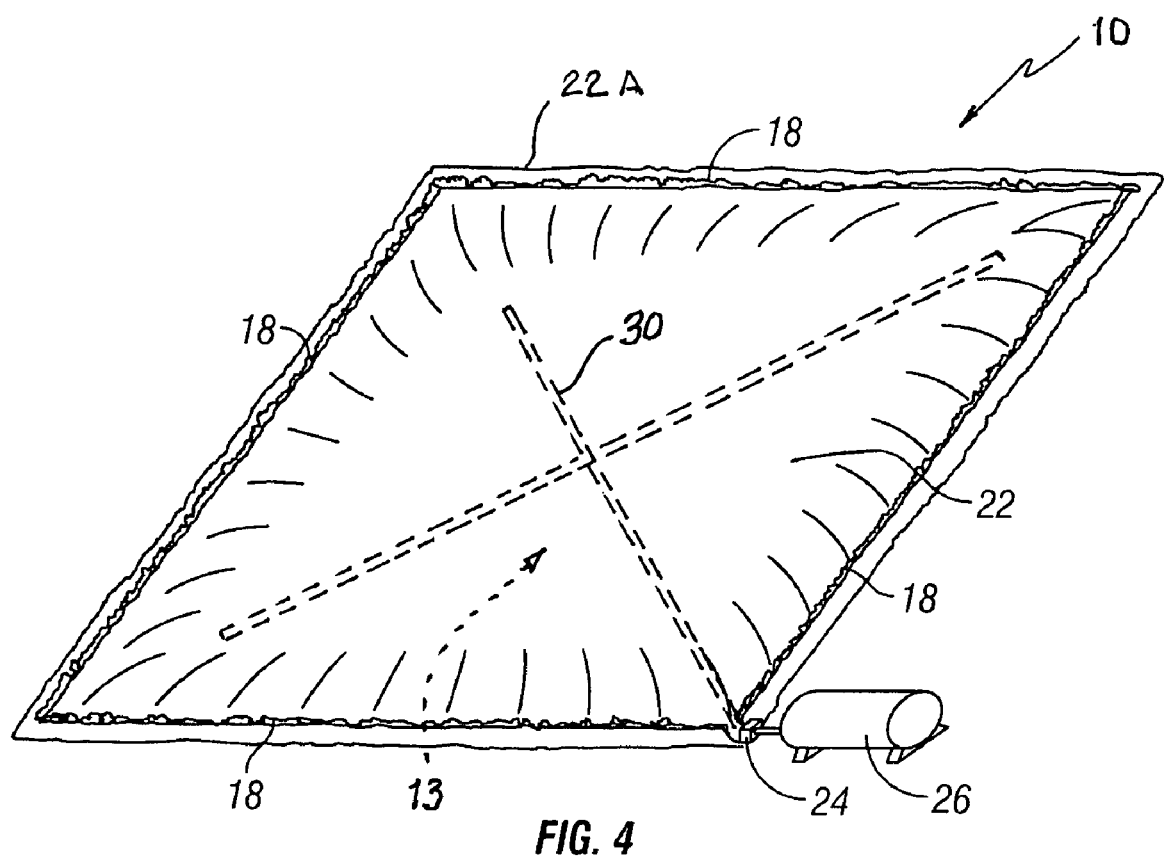
FIG. 4 is a perspective view of the disposal site with a sheeting covering the filled and covered trenches and showing a piping system for collecting gases including a pumping and storage station.

Preferably, the sheeting 22 is sealed by placing earth 18 along a peripheral edge 22A of the sheeting 22 as shown in FIG. 4. Alternatively, sheeting 22 may be secured peripherally by weights, stakes and other well known methods. The sheeting 22 may be polyethylene or similar sheet material having a thickness of several thousandths of an inch in thickness.

Gases 13 rise up through the earth 18 from the trenches 14 and out into the air space 28 between the surface of the disposal site 10 and the sheeting 22. Preferably, a perforated pipe system 30, as shown in FIG. 4, is connected with one or more suction pumps 24 positioned for collecting the accumulating gases 13, and for delivering them into holding tanks 26 or tanker trucks, etc. In a large site of the type described herein multiple pumps 24 and tanks 26 may be used as necessary. Because the trenches 14 are set in a crisscrossed pattern, the amount of gas evolved and collected per acre is higher then if only a single set of trenches were to be used.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A method for disposing of sludge comprising the steps of:
   a) excavating a linearly directed trench in an earthen disposal site, the site having a natural site surface;
   b) placing earth removed from the trench onto the site surface;
   c) dumping sludge into the trench to a selected height therein;
   d) covering the sludge with the removed earth;
   e) repeating steps (a) through (d) cyclically to form a first plurality of sludge-filled and covered trenches in positions mutually spaced apart and essentially parallel; and
   f) repeating steps (a) through (e) to form at least one further plurality of sludge-filled and covered trenches, wherein the at least one further plurality of sludge-filled and covered trenches has an orientation that crisscrosses the trenches of the first plurality.

2. The method of claim 1 wherein steps (a) through (d) are completed in linear segments controlled by sludge availability.

3. The method of claim 1 wherein steps (c) and (d) are completed in segments controlled by sludge availability.

4. The method of claim 1 comprising the further steps of: placing a gas-impermeable sheeting over the disposal site; sealing the sheeting peripherally; and drawing off sludge evolved gases accumulated under the sheeting.

5. The method of claim 4 comprising the further step of placing earth along a peripheral edge of the sheeting to complete the step of sealing the sheeting peripherally.

6. The method of claim 1 wherein the trenches of step (f) are less deep than the first plurality of sludge-filled and covered trenches.

7. The method of claim 1 wherein the trenches of step (f) are placed at a depth so as to not disturb the sludge deposited within the first plurality of sludge-filled and covered trenches.

8. The method of claim 7 wherein the trenches of step (f) are formed after the sludge of the first plurality of sludge-filled and covered trenches has fully dewatered and compacted.

* * * * *